United States Patent [19]

Kinsey, Jr. et al.

[11] Patent Number: 5,728,249
[45] Date of Patent: Mar. 17, 1998

[54] METHOD OF RADIO FREQUENCY SEALING NON-FOIL PACKAGING STRUCTURES

[75] Inventors: Joe L. Kinsey, Jr., Irvington, Ala.; Mari Asanuma, Raleigh, N.C.

[73] Assignee: International Paper Company, Purchase, N.Y.

[21] Appl. No.: 498,268

[22] Filed: Jul. 3, 1995

Related U.S. Application Data

[63] Continuation of Ser. No. 98,919, Jul. 29, 1993, abandoned.

[51] Int. Cl.$^6$ .............................. B32B 31/24; B32B 31/28
[52] U.S. Cl. ........................ 156/275.1; 156/272.2; 156/308.4; 53/477; 53/DIG. 2
[58] Field of Search .................. 156/251, 272.2, 156/275.1, 308.2, 308.4; 53/476, 477, DIG. 2; 428/34.2, 34.3, 36.7

[56] References Cited

U.S. PATENT DOCUMENTS

| | | |
|---|---|---|
| 3,876,452 | 4/1975 | Anspon et al. . |
| 4,279,344 | 7/1981 | Holloway, Jr. . |
| 4,448,792 | 5/1984 | Schirmer . |
| 4,455,184 | 6/1984 | Thompson . |
| 4,478,972 | 10/1984 | Conrady . |
| 4,640,865 | 2/1987 | Lancaster et al. . |
| 4,660,354 | 4/1987 | Lancaster et al. . |
| 4,789,575 | 12/1988 | Gibbons et al. ............ 428/34.2 |
| 4,795,665 | 1/1989 | Lancaster et al. . |
| 4,888,249 | 12/1989 | Flores et al. . |
| 4,950,510 | 8/1990 | Massouda . |
| 5,133,999 | 7/1992 | Lofgren et al. ............ 428/34.2 |
| 5,272,210 | 12/1993 | Galante . |
| 5,399,396 | 3/1995 | Ohlsson et al. ......... 428/36.7 X |
| 5,601,889 | 2/1997 | Chundury et al. ........... 428/34.3 |

FOREIGN PATENT DOCUMENTS

| | | |
|---|---|---|
| 0 461 868 | 12/1991 | European Pat. Off. . |
| 2 023 495 | 1/1980 | United Kingdom . |

*Primary Examiner*—Curtis Mayes
*Attorney, Agent, or Firm*—Loffman, Wasson & Gitler; Michael J. Doyle

[57] ABSTRACT

A method of forming a non-foil barrier laminate structure which can be made into a container using radio-frequency heat-sealing techniques. The structure incorporates radio-frequency sealable ethyl acrylates which, in combination with additional thermoplastic material layers, produce a structure that can be formed, filled and sealed into cartons on commercially available form-fill-seal-machinery fitted with a radio frequency generator and sealing tool.

15 Claims, 4 Drawing Sheets

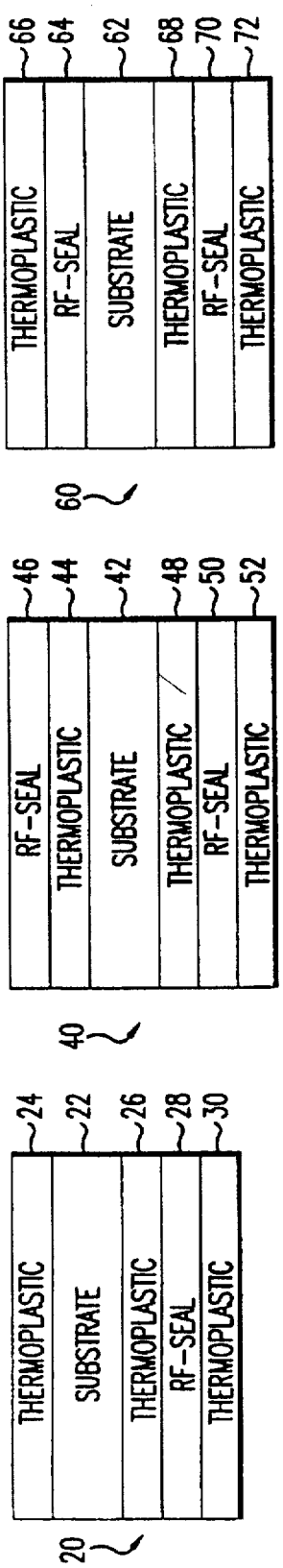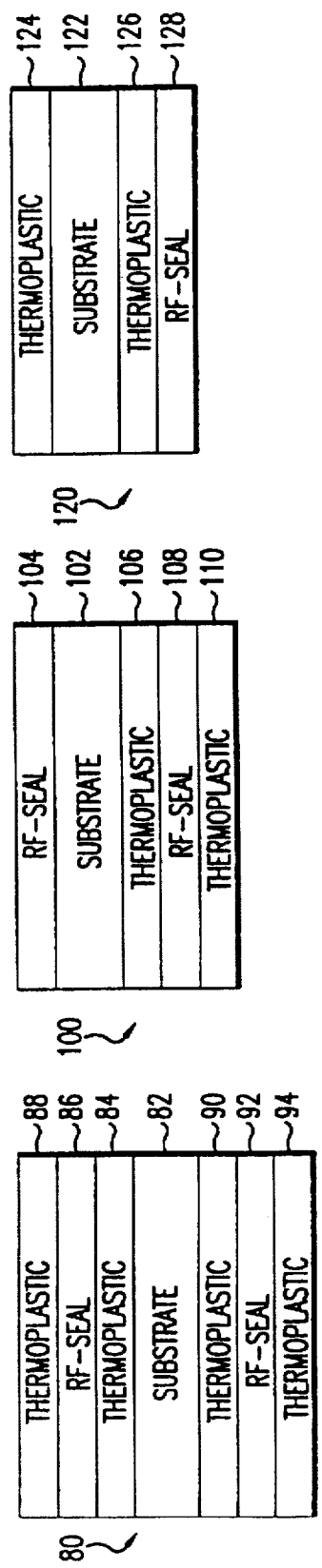

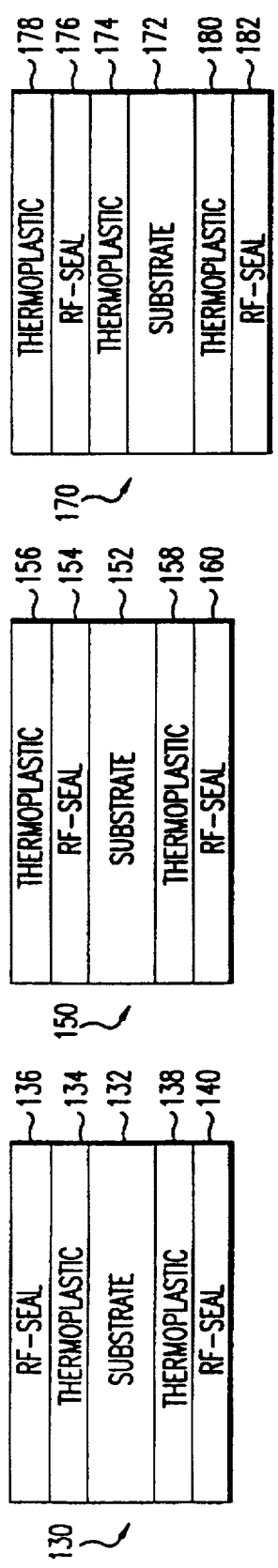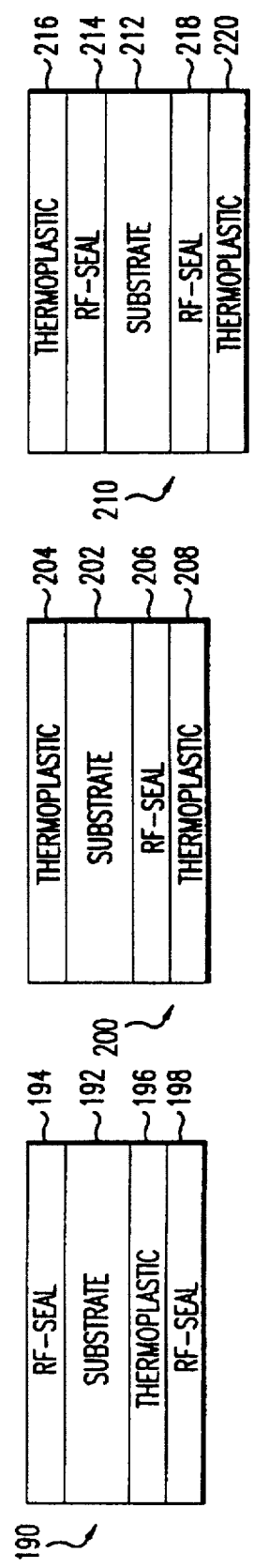

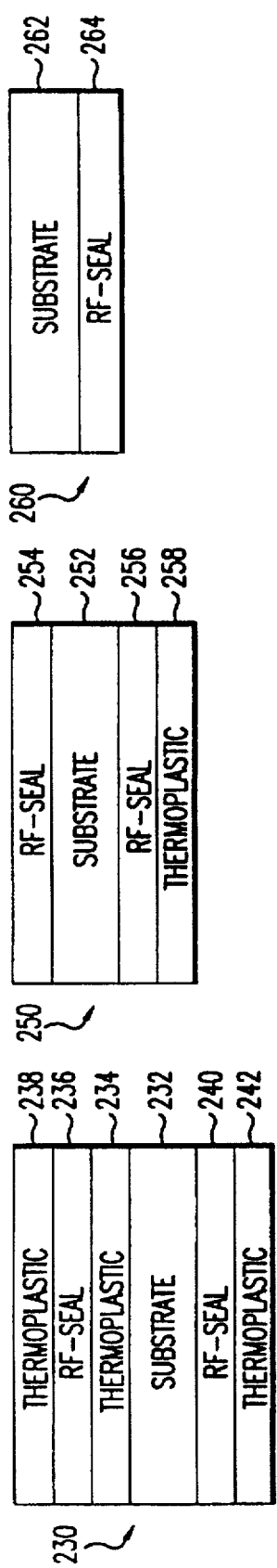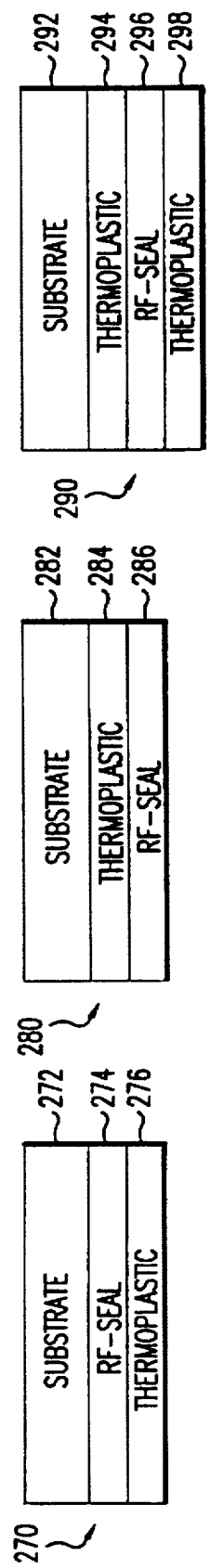

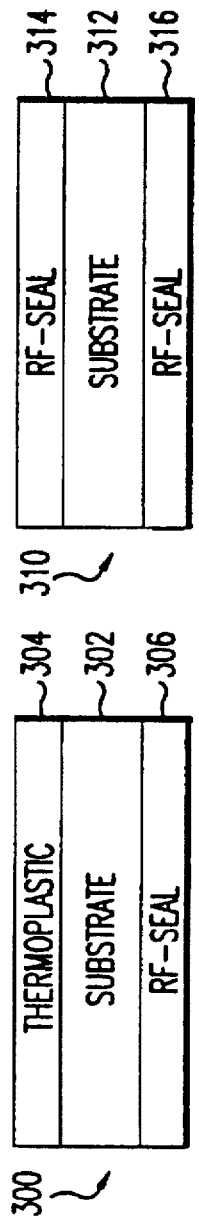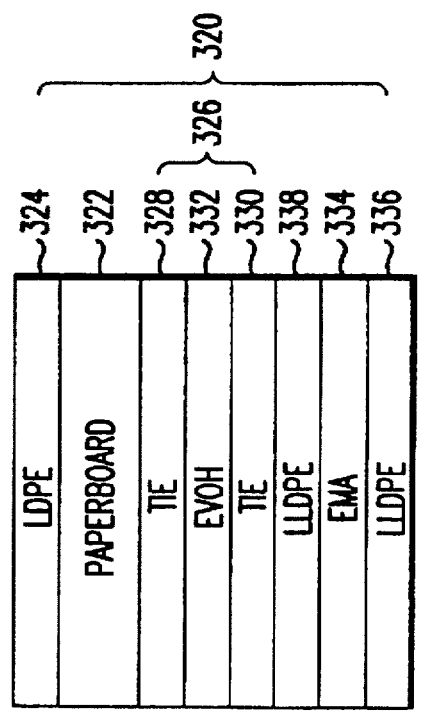
FIG.20
FIG.19
FIG.21

METHOD OF RADIO FREQUENCY SEALING NON-FOIL PACKAGING STRUCTURES

This is a continuation of application Ser. No. 08/098,919 filed on Jul. 29, 1993, now abandoned.

1. Field of the Invention

A novel non-foil barrier laminate structure for packaging which facilitates the use of radio-frequency (RF) or dielectric sealing techniques in place of conventional heat sealing and/or induction sealing technology.

BACKGROUND OF THE INVENTION

Legislation in several states has banned, or proposes to ban or severely restrict, the sale of laminated packages utilizing aluminum foil in their structures. These legal measures represent a threat to the current foil-based packaging products now being produced and sold.

An example of a package currently threatened by these "anti-foil" legislative actions is the paperboard-based aseptic brick package. This package depends on aluminum foil laminate to provide gas barrier and facilitate induction sealing of the package. Induction sealing is the preferred method of sealing for this type of package because it produces hermetic seals at high speeds. Induction sealing requires incorporation of a conductive layer such as aluminum foil in the laminate to act as the heating element when exposed to electromagnetic energy.

Technologies to produce non-foil packages with good gas barrier properties are known. However, producing high speed heat-induced-defect-free seals, particularly in paperboard based structures, using conventional heat sealing techniques is extremely difficult. Additionally, most polymers are non-conductors, eliminating the possibility of induction sealing; and incorporation of any conductive metal material might jeopardize its status under the new and proposed legislation. In light of these circumstances, an alternative sealing methodology and materials are required to produce hermetic non-foil packages, particularly paperboard based non-foil packages.

Radio frequency (RF) sealing or dielectric sealing effects seals by vibrating the molecular dipoles of a polymer with electromagnetic energy in the 1 MHz to 300 MHz frequency range. Vibration of the molecular dipoles of the polymer generates heat within the polymer which then melts the polymer. If the molten polymer is in intimate contact with another polymer or other surface of compatible nature, a seal can be effected by cooling the joint. Not all polymers are heatable in an RF energy field. Common polymers such as polyethylene and polypropylene are not RF heatable. In order for a polymer to be RF heatable, it must have sufficient polar content and have a high dielectric loss factor. The dielectric loss factor is the product of the dielectric constant and the dielectric loss tangent (tan $\delta$). Typically, polymers that are easily RF heatable have dielectric loss factors greater than 0.2.

Radio frequency heating and welding of plastics is not a new art. It has been practiced in industry for many years. However, application of RF sealing techniques to packaging, and particularly liquid packaging is not common. Two patent citations of particular interest to this field are U.S. Pat. No. 3,992,606 and U.S. Pat. No. 4,660,354.

U.S. Pat. No. 3,992,606, Arutt et al, discloses a portable dielectric (RF) sealer for plastic sheets or films. The patent makes no mention of packaging structures, nor does it detail particular applications for the device. The disclosure is confined to a heat sealing device that produces a 27.12 Mhz RF current coupled to a sealing press containing the sealing electrodes.

U.S. Pat. No. 4,660,354, Lancaster et al, discloses a method for filling and sealing a container, wherein the structure is sealed in both the microwave (300 MHz–10,000 MHz) range and the RF (1 MHz–300 MHz) range utilizing a carbon monoxide-ethylene copolymer as the RF heatable material.

It is an object of the present invention to provide alternative, novel sealing methodology and materials for novel non-foil packaging structures.

It is a further object of the present invention to provide a method of sealing plastic materials in a structure in a very fast and efficient manner, even through contamination.

It is still a further object of the present invention to produce non-foil barrier structures, which have sufficient barrier properties for hermetic packaging applications, and which are sealable on commercially available form-fill-seal machinery with minor modifications.

SUMMARY OF THE INVENTION

The present invention produces non-foil barrier laminate structures for hermetic packaging applications which are sealable on commercially available form-fill-seal machinery modified to utilize RF sealers. The present invention provides a method and materials for sealing non-foil laminate structures in a very fast and efficient manner, even though the seal area may be contaminated by the product to be packaged.

The novel non-foil laminate structures incorporate an RF-heatable material such as ethylene methylacrylate, ethylene butylacrylate, and/or ethylene ethylacrylate. These copolymers are easily processed, have high conversion of RF energy into heat, and are relatively low cost. The non-foil laminate structures may include a thermoplastic oxygen barrier, such as ethylene vinyl alcohol polymer, vinyl alcohol polymer, nylon, polyester, copolyester, vinylidene chloride polymer, or silicon oxide, individually or in combination. The laminate structure may include polyolefins, such as polyethylene (low density, linear low density, medium density, or blends) or polypropylene, other thermoplastics as sealants and/or bulking layers, or blends thereof. The non-foil laminate structures may include a substrate or carrier layer, such as paper, paperboard, woven or non-woven fabric, plastic sheet, or plastic film.

These materials are novelly incorporated into non-foil laminates to produce an RF-sealable packing structure by sealing the laminate to itself using a radio-frequency in the range of 1 to 300 MHz. The laminate structures are converted on commercially available form-fill-seal machinery, fitted with a commercially available radio frequency generator and sealing tooling.

BRIEF DESCRIPTION OF THE DRAWINGS

FIG. 1 is a cross-section of a laminate structure embodying the present invention;

FIG. 2 is a cross-section of an alternate embodiment of laminate structure embodying the present invention;

FIG. 3 is a cross-section of an alternate embodiment of laminate structure embodying the present invention;

FIG. 4 is a cross-section of an alternate embodiment of laminate structure embodying the present invention;

FIG. 5 is a cross-section of an alternate embodiment of laminate structure embodying the present invention;

FIG. 6 is a cross-section of an alternate embodiment of laminate structure embodying the present invention;

FIG. 7 is a cross-section of an alternate embodiment of laminate structure embodying the present invention;

FIG. 8 is a cross-section of an alternate embodiment of laminate structure embodying the present invention;

FIG. 9 is a cross-section of an alternate embodiment of laminate structure embodying the present invention;

FIG. 10 is a cross-section of an alternate embodiment of laminate structure embodying the present invention;

FIG. 11 is a cross-section of an alternate embodiment of laminate structure embodying the present invention;

FIG. 12 is a cross-section of an alternate embodiment of laminate structure embodying the present invention;

FIG. 13 is a cross-section of an alternate embodiment of laminate structure embodying the present invention;

FIG. 14 is a cross-section of an alternate embodiment of laminate structure embodying the present invention;

FIG. 15 is a cross-section of an alternate embodiment of laminate structure embodying the present invention;

FIG. 16 is a cross-section of an alternate embodiment of laminate structure embodying the present invention;

FIG. 17 is a cross-section of an alternate embodiment of laminate structure embodying the present invention;

FIG. 18 is a cross-section of an alternate embodiment of laminate structure embodying the present invention;

FIG. 19 is a cross-section of an alternate embodiment of laminate structure embodying the present invention;

FIG. 20 is a cross-section of an alternate embodiment of laminate structure embodying the present invention; and FIG. 21 is a cross-section of an alternate embodiment of laminate structure embodying the present invention.

DETAILED DESCRIPTION OF THE INVENTION

This invention provides a method and materials to produce non-foil packaging structures having sufficient barrier properties for high-barrier or other packaging applications. The structures are sealable on commercially available form-fill-seal machinery fitted with a radio frequency generator and sealing tooling. Generators and sealing tools operating in the 1 MHz to 300 MHz, and preferably 27 MHz to 65 MHz, may be used.

The structures are produced by applying commercially available thermoplastic materials to a substrate. The preferred substrate is a paper or paperboard web; however, this substrate may be a polymer film or sheet web, woven fabric web, or non-woven fabric web. The specifications for the substrate apply to all embodiments of this invention. The application of the thermoplastics to the web may be accomplished by any of several methods that anyone skilled in the art of producing packaging laminates should be able to accomplish. These include, but are not limited to, extrusion, coextrusion, extrusion coating, coextrusion coating, extrusion lamination, adhesive lamination, and heat lamination.

The structures incorporate a radio-frequency-heatable thermoplastic polymer to render the structures sealable with a radio frequency generator and sealing tool. The radio-frequency-heatable polymer may be selected from ethylene acrylate copolymers such as ethylene methylacrylate, ethylene butylacrylate, and/or ethylene ethylacrylate. These copolymers convert electromagnetic energy into heat in a rapid fashion to permit commercial carton formation on conventional form-fill-seal machinery. These materials are preferred for all embodiments of the invention.

The structures also incorporate one or more thermoplastic layers as sealants, barriers, print surfaces, and/or bulking layers. The thermoplastic layers may be single material layers or multiple-layer sandwiches of different materials. The multiple-layer sandwiches are particularly useful when barrier materials such as ethylene vinyl alcohol, nylon, polyester, polyvinylidene chloride, silicon oxide, or others are combined with sealant/bulking layers such as polyethylene or polypropylene to produce high barrier/low cost combinations. These specifications for the thermoplastic layers apply for all embodiments of the invention that include thermoplastic layers.

The following descriptions of the figures are intended to be examples of the embodiments that can be produced based on the above specifications.

FIG. 1 illustrates a laminate 20 including a substrate layer 22, a thermoplastic layer 24 on one face of the substrate, a thermoplastic layer 26 on the opposite face of the substrate, an RF heatable polymer layer 28 on the thermoplastic layer 26, and a thermoplastic layer 30 on the RF heatable polymer layer 28.

FIG. 2 illustrates a laminate 40 including a substrate layer 42, a thermoplastic layer 44 on one face of the substrate, an RF heatable polymer layer 46 on the thermoplastic layer 44, a thermoplastic layer 48 on the opposite face of the substrate, an RF heatable polymer layer 50 on the thermoplastic layer 48, and a thermoplastic layer 52 on the RF heatable polymer layer 50.

FIG. 3 illustrates a laminate 60 including a substrate 62, an RF heatable polymer layer 64 on one face of the substrate, a thermoplastic layer 66 on the RF heatable polymer layer 64, a thermoplastic layer 68 on the opposite face of the substrate, an RF heatable polymer layer 70 on the thermoplastic layer 68, and a thermoplastic layer 72 on the RF heatable polymer layer 70.

FIG. 4 illustrates a laminate 80 including a substrate 82, a thermoplastic layer 84 on one face of the substrate, an RF heatable polymer layer 86 on the thermoplastic layer 84, a thermoplastic layer 88 on the RF heatable polymer layer 86, a thermoplastic layer 90 on the opposite face of the substrate, an RF heatable polymer layer 92 on the thermoplastic layer 90, and a thermoplastic layer 94 on the RF heatable polymer layer 92.

FIG. 5 illustrates a laminate 100 including a substrate 102, an RF heatable polymer layer 104 on one face of the substrate, a thermoplastic layer 106 on the opposite face of the substrate, an RF heatable polymer layer 108 on the thermoplastic layer 106, and a thermoplastic layer 110 on the RF-heatable layer 108.

FIG. 6 illustrates a laminate 120 including a substrate 122, a thermoplastic layer 124 on one face of the substrate, a thermoplastic layer 126 on the opposite face of the substrate, and an RF heatable polymer layer 128 on the thermoplastic layer 126.

FIG. 7 illustrates a laminate 130 including a substrate 132, a thermoplastic layer 134 on one face of the substrate, an RF heatable polymer layer 136 on the thermoplastic layer 134, a thermoplastic layer 138 on the opposite face of the substrate, and an RF heatable polymer layer 140 on the thermoplastic layer 138.

FIG. 8 illustrates a laminate 150 including a substrate 152, an RF heatable polymer 154 on one face of the substrate, a thermoplastic layer 156 on the thermoplastic layer 154, a thermoplastic layer 158 on the opposite face of the substrate, and an RF heatable polymer layer 160 on the thermoplastic layer 158.

FIG. 9 illustrates a laminate 170 including a substrate 172, a thermoplastic layer 174 on one face of the substrate, an RF heatable polymer 176 on the thermoplastic layer 174, a thermoplastic layer 178 on the RF heatable polymer layer 176, a thermoplastic layer 180 on the opposite face of the substrate, and an RF heatable polymer layer 182 on the thermoplastic layer 180.

FIG. 10 illustrates a laminate 190 including a substrate 192, an RF heatable polymer layer 194 on one face of the substrate, a thermoplastic layer 196 on the opposite face of the substrate, and an RF heatable polymer layer 198 on the thermoplastic layer 196.

FIG. 11 illustrates a laminate 200 including a substrate 202, a thermoplastic layer 204 on one face of the substrate and RF heatable polymer layer 206 on the opposite face of the substrate, and a thermoplastic layer on the RF heatable polymer layer 206.

FIG. 12 illustrates a laminate 210 including a substrate 212, an RF heatable polymer layer 214 on one face of the substrate, a thermoplastic layer 216 on the RF heatable polymer layer 214, an RF heatable polymer layer 218 on the opposite face of the substrate, and a thermoplastic layer 220 on the RF heatable polymer layer 218.

FIG. 13 illustrates a laminate 230 including a substrate 232, a thermoplastic layer 234 on one face of the substrate, an RF heatable polymer layer 236 on the thermoplastic layer 234, a thermoplastic layer 238 on the RF heatable polymer layer 236, an RF heatable polymer layer 240 on the opposite face of the substrate, and a thermoplastic layer 242 on the RF sealable polymer layer 240.

FIG. 14 illustrates a laminate 250 including a substrate 252, an RF heatable polymer layer 254 on one face of the substrate, an RF heatable polymer layer 256 on the opposite face of the substrate, and a thermoplastic layer 258 on the RF heatable polymer layer 256.

FIG. 15 illustrates a laminate 260 including a substrate 262 and an RF heatable polymer layer 264 on one face of the substrate.

FIG. 16 illustrates a laminate 270 including a substrate 272, an RF heatable polymer layer 274 on one face of the substrate, and a thermoplastic layer 276 on the thermoplastic layer 274.

FIG. 17 illustrates a laminate 280 including a substrate 282, a thermoplastic layer 284 on one face of the substrate, and an RF heatable polymer layer 286 on the thermoplastic layer 284.

FIG. 18 illustrates a laminate 290 including a substrate 292, a thermoplastic layer 294 on one face of the substrate, an RF heatable polymer layer 296 on the thermoplastic layer 294, and a thermoplastic layer 298 on the RF heatable polymer layer 296.

FIG. 19 illustrates a laminate 300 including a substrate 302, a thermoplastic layer 304 on one face of the substrate and an RF heatable polymer layer 306 on the opposite face of the substrate.

FIG. 20 illustrates a laminate 310 including a substrate 312, an RF heatable polymer layer 314 on one face of the substrate and an RF heatable polymer layer 316 on the opposite face of the substrate.

A preferred paperboard structure is depicted by FIG. 21, wherein a laminate 320 contains a paperboard substrate 322, a layer of a polyolefin 324 such as low density polyethylene polymer located on the exterior of the substrate. A three layer sandwich 326 of tie layers 328 and 330 with a layer of an ethylene vinyl alcohol copolymer 332 therebetween, located on the interior of the substrate. A radio frequency (RF) sealable layer 334 is located on said sandwich layer 326. The RF sealable layer can be selected from ethylene ethylacrylate, ethylene butylacrylate, or preferably ethylene methylacrylate and is adhered to the tie layer 330 by a layer of LLDPE 338. Finally, there is located on the RF sealable layer 334, a polyolefin polymer layer 336 which is preferably linear low density polyethylene.

EXAMPLE 1

In order to determine the RF sealability of structures containing ethylene acrylate copolymer, structures described by FIG. 18 were produced.

The substrate was a milk carton type paperboard. The thermoplastic layer next to the substrate was low density polyethylene (LDPE) at 10 lbs./3000 ft$^2$. The RF-seal layer was ethylene methylacrylate (EMA), ethylene butylacrylate (EBA), or ethylene ethylacrylate (EEA) at 3, 6, 9 and 12 lbs./3000 ft$^2$. The thermoplastic layer on the RF-seal layer was linear low density polyethylene at 15 lbs./3000 ft$^2$.

Minimum sealing times for each trial structure were determined. The sealing tests were made on a Callanan 1.5 Kw RF sealer operating at 27 MHz and 65 MHz sealing frequencies using a 2 inch by ⅛ inch brass sealing electrode. The minimum sealing time for each structure and frequency was determined at sealer power settings of 60%, 70%, 80%, 90% and 100%. Minimum sealing time was defined as the minimum generator dwell time at which 100% fiber tearing seals were made. Less than 100% fiber tear was considered an incomplete seal. These data (Table 1) show that at 65 MHz sealing frequency, 100% fiber tearing seals can be made in between 190 and 240 milliseconds. The data also show that all of the RF-seal layer materials show good efficacy for RF sealing and that RF-seal layer coating weights do not impact sealing times significantly. These data further demonstrate that higher sealing frequencies are less prone to arcing. Arcing is a sudden electrical discharge that sometimes occurs between the sealer electrode and the article to be sealed. When an arc occurs, damage to the article and sometimes the sealer electrode occurs. Seals in which an arc occurred are often incomplete. Arcing is a phenomenon to be avoided.

Example 2

To demonstrate the RF sealability of high barrier structures incorporating an ethylene acrylate copolymer, four structures described by FIG. 1 were pilot produced.

In these structures, the substrate is paperboard. The thermoplastic layer on one face of the substrate is LDPE at 10 lbs./3000 ft$^2$. The thermoplastic layer on the opposite face of the substrate is coextruded sandwich of 7 lbs./3000 ft$^2$ of polyethylene based tie resin 5 lbs./5000 ft$^2$ EVOH, and 7 lbs./3000 ft$^2$ polyethylene based tie resin. The RF-seal layer on the barrier thermoplastic layer is 14 lbs./3000 ft$^2$ of EMA. The thermoplastic layer on the RF-seal layer is 12 lbs./3000 ft$^2$ of LLDPE for one structure, 3 lbs./3000 ft$^2$ LLDPE for another structure, 12 lbs./3000 ft$^2$ of LDPE for another structure, and 3 lbs./3000 ft$^2$ of LDPE for the last structure.

The minimum RF sealing times and maximum sealer powers were determined for these structures at 27 MHz and 65 MHz sealer frequency. Power levels above those indicated caused arcing between the electrode and the article. These tests were performed on a Callanan 1.5 kW RF sealer operating at 27 MHz or 65 MHz using a 2 inch-by-⅛ inch brass sealing electrode. Minimum sealing time was defined as the minimum generator dwell time at which 100% fiber tearing seals were made. Less than 100% fiber tear was considered an incomplete seal.

These date (Table 2) show that 100% fiber tearing seals can be made with these structures in as little as 30 milliseconds depending on the type of polyethylene, the sealant layer polyethylene coating weight, and sealer frequency. The lower the sealant layer polyethylene coating weight, the faster the seal can be made. The findings of Example 1 show that conversion of electromagnetic energy to heat is sufficient regardless of EMA coating weight when the LLDPE coating weight is held constant. Example 2 demonstrates that sealing speed is controlled by the heat transfer through the LLDPE at a constant EMA coating weight. Thus, the lower the LLDPE coating weight, the faster the heat transfer and sealing.

A sealer frequency of 65 MHz provides faster seals with less chance of arcing than the 27 MHz frequency. Above 40% power at 27 MHz, frequent arcing between the sealing electrode and the article occurred. These data confirm that a high barrier structure can be produced that is easily sealable using RF sealing techniques.

What is claimed is:

1. A process for forming a non-foil packaging structure, comprising the steps of:
   a) forming a laminate comprising:
      a paperboard substrate having a first surface and a second surface corresponding to two sides of said substrate;
      a radio-frequency sealable polymer layer selected from a group consisting of ethylene methylacrylate copolymer, ethylene butylacrylate copolymer, and ethylene ethylacrylate copolymer located on said first surface of said substrate; and
      at least one layer of thermoplastic material disposed on said radio-frequency sealable polymer layer;
   b) sealing said laminate to itself using a radio-frequency in a range of 1 to 300 MHz.

2. A process as recited in claim 1, wherein said thermoplastic material is polyethylene, polypropylene or blends thereof.

3. A process as recited in claim 1, wherein said laminate further comprises a second radio-frequency sealable polymer layer selected from the group consisting of ethylene methacrylate, ethylene butylacrylate, and ethylene ethylacrylate disposed on said second surface of said substrate.

4. A process as recited in claim 3, wherein said laminate further comprises:
   at least one layer of a second thermoplastic material located on said second radio-frequency sealable polymer layer.

5. A process as recited in claim 4, wherein said laminate further comprises:
   at least one layer of a third thermoplastic material located between said second radio-frequency sealable polymer layer and said second surface of said substrate.

6. A process as recited in claim 1, wherein said laminate further comprises;
   at least one layer of said thermoplastic material disposed on said second surface of said substrate.

7. A process as recited in claim 6, wherein said thermoplastic material is polyethylene, polypropylene, or blends thereof.

8. A process for forming a non-foil packaging structure, comprising the steps of:
   forming a laminate comprising:
      a paperboard substrate having a first surface and a second surface corresponding to two sides of said substrate;
      at least one layer of thermoplastic material located on said first surface of said substrate;
      a radio-frequency sealable polymer layer selected from the group consisting of ethylene methylacrylate copolymer, ethylene butylacrylate copolymer, and ethylene ethylacrylate copolymer located on said at least one layer of thermoplastic material; and
   sealing said laminate to itself using a radio frequency in a range of 1 to 300 MHz.

9. A process as recited in claim 8, wherein said laminate further comprises a second radio frequency sealable polymer layer located on said second surface of said substrate.

10. A process as recited in claim 9, wherein said laminate further comprises at least one layer of a thermoplastic material located on said second radio-frequency sealable layer.

11. A process as recited in claim 8, wherein said laminate further comprises at least one layer of a thermoplastic material located between a second radio-frequency sealable layer and said second surface of said substrate.

12. A process for forming a non-foil packaging structure, comprising the steps of:
   forming a laminate comprising:
      a paperboard substrate having a first surface and a second surface corresponding to two sides of said substrate,
      a first thermoplastic polymer material layer coated on said first surface of said paperboard substrate,
      a first polymer adhesive tie layer located on said second surface of said paperboard substrate, an oxygen barrier polymer adhesive tie layer located on said first polymer adhesive tie,
      a second polymer adhesive tie layer located on said oxygen barrier polymer material,
      a radio-frequency sealable polymer layer selected from the group consisting of ethylene methylacrylate copolymer, ethylene butylacrylate copolymer, and ethylene ethylacrylate copolymer, located on said second polymer adhesive tie layer, and
      a second thermoplastic polymer layer coated on said radio-frequency sealable polymer layer; and
   sealing said laminate to itself using a radio frequency in a range of 1 to 300 MHz.

13. A process as recited in claim 12, wherein said first and second thermoplastic polymer material layers are a polyolefin.

14. A process as recited in claim 12, wherein said first and second polymer adhesive tie layers are polyolefins, ethylene based graft copolymers, zinc salts of ethylene methacrylic acid copolymers, ethylene vinyl acetate copolymers, or ethylene methacrylate copolymers.

15. A process as recited in claim 12, wherein said oxygen barrier polymer material is ethylene vinyl alcohol copolymer.

* * * * *